April 12, 1960     I. L. WILCOX     2,932,437
CUP
Filed March 14, 1957
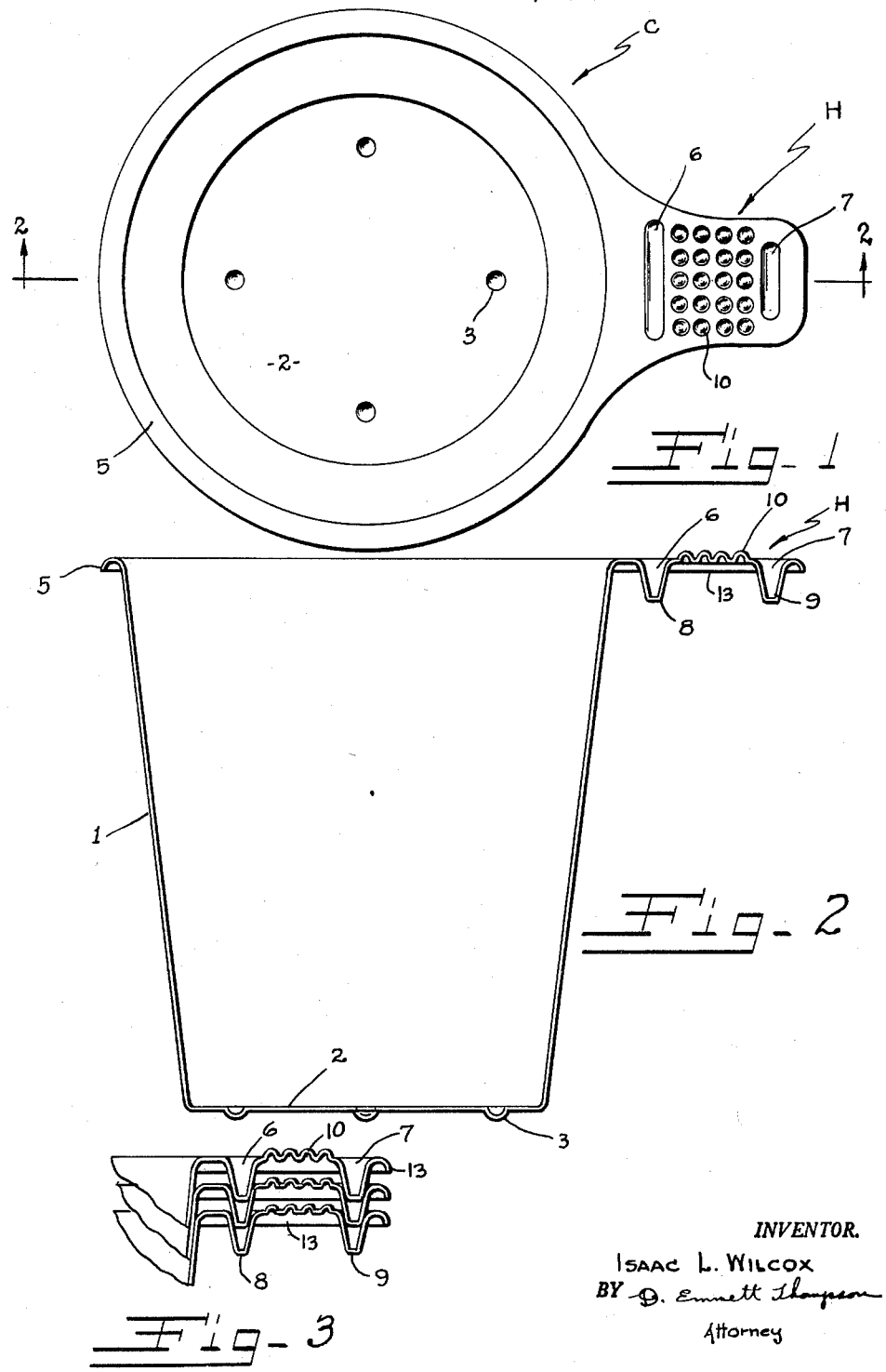
INVENTOR.
ISAAC L. WILCOX
BY D. Emmett Thompson
Attorney

United States Patent Office 2,932,437
Patented Apr. 12, 1960

2,932,437

CUP

Isaac L. Wilcox, Fulton, N.Y., assignor to Sealright-Oswego Falls Corporation, Fulton, N.Y., a corporation of New York Application March 14, 1957, Serial No. 646,137

4 Claims. (Cl. 229—1.5)

This invention relates to containers and more particularly to containers in the form of cups used in connection with hot beverages.

The invention has as an object a cup having an integral handle portion embodying a structural arrangement whereby the cups can be nested one within the other in stack formation, the handle providing a particularly rigid appendage for handling the filled cup, and the arrangement being such that the handle is particularly convenient to grasp and the fingers are protected from engagement with the heated side wall of the cup when the same contains a hot beverage.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a top plan view of a cup of my invention.

Figure 2 is a section taken on the line 2—2 of Figure 1.

Figure 3 is a portion illustrating the nesting or stacking of a plurality of cups shown in Figures 1 and 2.

With reference to Figure 1, it will be seen that the cup, generally designated by the letter C, is of circular shape wherein the body portion 1 is an inverted frusto-conical shaped portion having a bottom 2 with a plurality of depressions 3 forming feet on the bottom of the cup. The edge of the cup is encircled by a rim 5. Extending outwardly from the body portion in the plane parallel to the bottom 2 is a handle or gripping portion generally designated by the letter H. This handle is shown as formed integrally with the body and has a pair of parallel hollow tapered depressions or grooves 6, 7, forming downwardly extending ribs 8, 9, on the bottom of the handle, see Figures 2 and 3. The upper surface of the handle, intermediate the depressions 6, 7, is formed with a plurality of upstanding dimples or protuberances 10. The ribs 8, 9, are so spaced apart in a radial direction whereby the index finger is secured between the ribs and the top dimpled surface of the handle is engaged by the thumb.

The inner rib 8 is located in proximity to the cup body to prevent engagement of the cup body by the finger, which is of importance when hot beverages are served in the cup. The outer rib 9 serves to improve the grip on the handle. These ribs 8, 9, serve to increase the strength and rigidity of the handle, and also the depending flange 13 about the perimeter of the handle serves to that end. Further, the dimples 10 serve to stiffen the handle.

This structural arrangement permits the cup to be formed of light weight plastic material, or the like. The walls of the depressions diverge upwardly, whereby the ribs 8, 9, are tapered. This permits the handle portions to nest, as well as the tapered bodies of the cups, see Figure 3.

What I claim is:

1. A cup molded of plastic material comprising a conical body having an integral handle extending radially from the upper edge of the body, said body being formed with an outwardly and downwardly curved flange encircling the upper edge thereof and extending about the perimeter of the handle, said handle being formed with a depression in proximity to the body, the side walls of said depression diverging upwardly and merging with the handle.

2. A cup having a body of hollow inverted frusto-conical shape formed with an integral handle extending radially outwardly from and coplanar with the upper edge of the body, said handle being formed on its under surface with a pair of depending tapered hollow ribs extending transversely of the handle and being spaced apart in a direction radially of the cup for the reception of the index finger therebetween.

3. A cup as defined in claim 2 wherein said ribs form depressions extending transversely of the handle, the side walls of said depression converging inwardly, whereby the cups are adapted to be nested in stack formation.

4. A cup having a tapered body of hollow inverted frusto-conical shape formed with an integral handle extending radially outwardly from and coplanar with the upper edge of the body, portions of the upper surface of said handle being depressed to form depressions extending transversely of the handle, the side walls of said depressions converging inwardly, said depressions forming ribs on the under side of the handle, said ribs being spaced apart in a direction radially of the cup, the upper surface of said handle intermediate said depressions being formed with a plurality of upstanding protuberances.

References Cited in the file of this patent

UNITED STATES PATENTS

| 1,673,406 | Drumm | June 12, 1928 |
|---|---|---|
| 1,674,452 | Slick | June 19, 1928 |
| 2,262,204 | Rideout | Nov. 11, 1941 |
| 2,263,885 | McGauley | Nov. 25, 1941 |
| 2,283,019 | Serr | May 12, 1942 |
| 2,309,111 | Hothersall | Jan. 26, 1943 |
| 2,404,130 | Frank | July 16, 1946 |
| 2,473,964 | Moore | June 21, 1949 |